(12) United States Patent
Jammoussi et al.

(10) Patent No.: US 11,119,491 B2
(45) Date of Patent: Sep. 14, 2021

(54) VEHICLE STEERING CONTROL (71) Applicant: Ford Global Technologies, LLC, Dearborn, MI (US)

(72) Inventors: Hassene Jammoussi, Canton, MI (US); Pankaj Kumar, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 293 days.

(21) Appl. No.: 16/269,855

(22) Filed: Feb. 7, 2019

(65) Prior Publication Data
US 2020/0257297 A1 Aug. 13, 2020

(51) Int. Cl.
*G05D 1/02* (2020.01)

(52) U.S. Cl.
CPC ......... *G05D 1/0214* (2013.01); *G05D 1/0246* (2013.01); *G05D 2201/0212* (2013.01); *G05D 2201/0213* (2013.01)

(58) Field of Classification Search
CPC .... B62D 15/0246; B62D 15/025; B62D 6/00; G05D 2201/0212; G05D 2201/0213; G05D 2201/0214; G06K 9/00798; B60W 2050/008
See application file for complete search history.

(56) References Cited

U.S. PATENT DOCUMENTS

| | | | |
|---|---|---|---|
| 8,855,860 B2 | 10/2014 | Isaji et al. | |
| 9,620,013 B2 | 4/2017 | Han et al. | |
| 9,922,565 B2 * | 3/2018 | Thomas | B60W 30/08 |
| 10,037,472 B1 * | 7/2018 | Chen | G01S 13/867 |
| 10,816,972 B2 * | 10/2020 | Michalakis | G05D 1/0088 |
| 10,850,737 B2 * | 12/2020 | Kim | B60W 30/0956 |
| 10,885,790 B2 * | 1/2021 | Kim | B60W 40/02 |
| 2012/0314070 A1 | 12/2012 | Zhang et al. | |
| 2015/0353082 A1 * | 12/2015 | Lee | B60W 30/10 701/41 |
| 2017/0341647 A1 * | 11/2017 | Rajvanshi | B60W 30/12 |
| 2018/0031384 A1 | 2/2018 | Lee et al. | |
| 2018/0056999 A1 * | 3/2018 | Damiani | G01S 13/931 |
| 2018/0114441 A1 † | 4/2018 | Marmet et al. | |
| 2019/0096257 A1 * | 3/2019 | Alcazar | G06K 9/00798 |
| 2020/0049513 A1 * | 2/2020 | Ma | G05D 1/0088 |
| 2020/0207343 A1 † | 7/2020 | Vassilovski et al. | |

FOREIGN PATENT DOCUMENTS

CN 106096525 A 11/2016

* cited by examiner
† cited by third party

*Primary Examiner* — Khoi H Tran
*Assistant Examiner* — Shahzab Hussain Shah
(74) *Attorney, Agent, or Firm* — Frank A. MacKenzie; Bejin Bieneman PLC (57) ABSTRACT

A system, including a means for controlling vehicle steering, braking and powertrain and a means for determining first lane marker distances based on second lane marker distances received at a first vehicle from a second vehicle and a distance and an angle measured from the first vehicle to the second vehicle. A vehicle can be operated based on the first lane marker distances and the means for controlling vehicle steering, braking and powertrain.

20 Claims, 5 Drawing Sheets

VEHICLE STEERING CONTROL

BACKGROUND

Vehicles can be equipped to operate in both autonomous and occupant piloted mode. By a semi- or fully-autonomous mode, we mean a mode of operation wherein a vehicle can be piloted partly or entirely by a computing device as part of a vehicle information system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

Vehicles can be equipped with computing devices, networks, sensors and controllers to acquire data regarding the vehicle's environment and to operate the vehicle based on the data. Safe and comfortable operation of the vehicle can depend upon acquiring accurate and timely data regarding the vehicle's environment. Vehicle sensors can provide data concerning routes to be traveled and objects to be avoided in the vehicle's environment. Safe and efficient operation of the vehicle can depend upon acquiring accurate and timely data regarding routes and objects in a vehicle's environment while the vehicle is being operated on a roadway.

DETAILED DESCRIPTION

A computing device in a vehicle can be programmed to acquire sensor data regarding the external environment of a vehicle and to use the sensor data to determine a path polynomial upon which to operate a vehicle based on a vehicle path in autonomous or semi-autonomous mode. A vehicle path is a straight or curved line that describes successive locations (i.e., locations at different times) of a vehicle on a two-dimensional (2D) plane parallel to the surface of a roadway upon which the vehicle operates. A vehicle can operate on a roadway by determining a vehicle path. A computing device can determine a vehicle path based on vehicle sensor data. When vehicle sensor data is not available, the computing device can determine a vehicle path based on data received from a second vehicle.

Disclosed herein is a method, including determining first lane marker distances based on second lane marker distances received at a first vehicle from a second vehicle and a distance and an angle measured from the first vehicle to the second vehicle, and operating a vehicle based on the first lane marker distances. The first lane marker distances can be based on trigonometric calculations that use the distance and angle to determine factors to convert second lane marker distances to first lane marker distances. Second lane marker distances can be distances measured from a centerline of the second vehicle to a left lane marker and a right lane marker. The distances from the centerline of the second vehicle to the left lane marker and the right lane marker can be based on second vehicle sensor data. The second vehicle can be operating in a second lane adjacent to a first lane in which the first vehicle is operating.

The second vehicle can be operating in a third lane separated from the first lane in which the first vehicle is operating by one or more additional lanes. first lane marker distances can be determined based on one or more additional lane marker distances received by the first vehicle from one or more additional vehicles and distances and angles measured from the first vehicle to the additional vehicles. The first lane marker distances can be determined based on averages of the second lane marker distances and additional lane marker distances. The distance and the angle can be determined based on first vehicle sensor data. The distance and the angle can be determined based on second vehicle sensor data and received by the first vehicle. Determining the vehicle path can include determining a nominal vehicle path based on the first lane marker distances. Operating the vehicle can include determining a vehicle path based on the nominal path and a vehicle location. Operating the vehicle can include controlling vehicle powertrain, brakes and steering to cause the vehicle to travel along the vehicle path. The first and second lane marker distances can be measured in global coordinates.

Further disclosed is a computer readable medium, storing program instructions for executing some or all of the above method steps. Further disclosed is a computer programmed for executing some or all of the above method steps, including a computer apparatus, programmed to determine first lane marker distances based on second lane marker distances received at a first vehicle from a second vehicle and a distance and an angle measured from the first vehicle to the second vehicle, and operate a vehicle based on the first lane marker distances. The first lane marker distances can be based on trigonometric calculations that use the distance and angle to determine factors to convert second lane marker distances to first lane marker distances. Second lane marker distances can be distances measured from a centerline of the second vehicle to a left lane marker and a right lane marker. The distances from the centerline of the second vehicle to the left lane marker and the right lane marker can be based on second vehicle sensor data. The second vehicle can be operating in a second lane adjacent to a first lane in which the first vehicle is operating.

The computer apparatus can be further programmed to operate a second vehicle in a third lane separated from the first lane in which the first vehicle is operating by one or more additional lanes. first lane marker distances can be determined based on one or more additional lane marker distances received by the first vehicle from one or more additional vehicles and distances and angles measured from the first vehicle to the additional vehicles. The first lane marker distances can be determined based on averages of the second lane marker distances and additional lane marker distances. The distance and the angle can be determined based on first vehicle sensor data. The distance and the angle can be determined based on second vehicle sensor data and received by the first vehicle. Determining the vehicle path can include determining a nominal vehicle path based on the first lane marker distances. Operating the vehicle can include determining a vehicle path based on the nominal path and a vehicle location. Operating the vehicle can include controlling vehicle powertrain, brakes and steering to cause the vehicle to travel along the vehicle path. The first and second lane marker distances can be measured in global coordinates.

Figure 1:
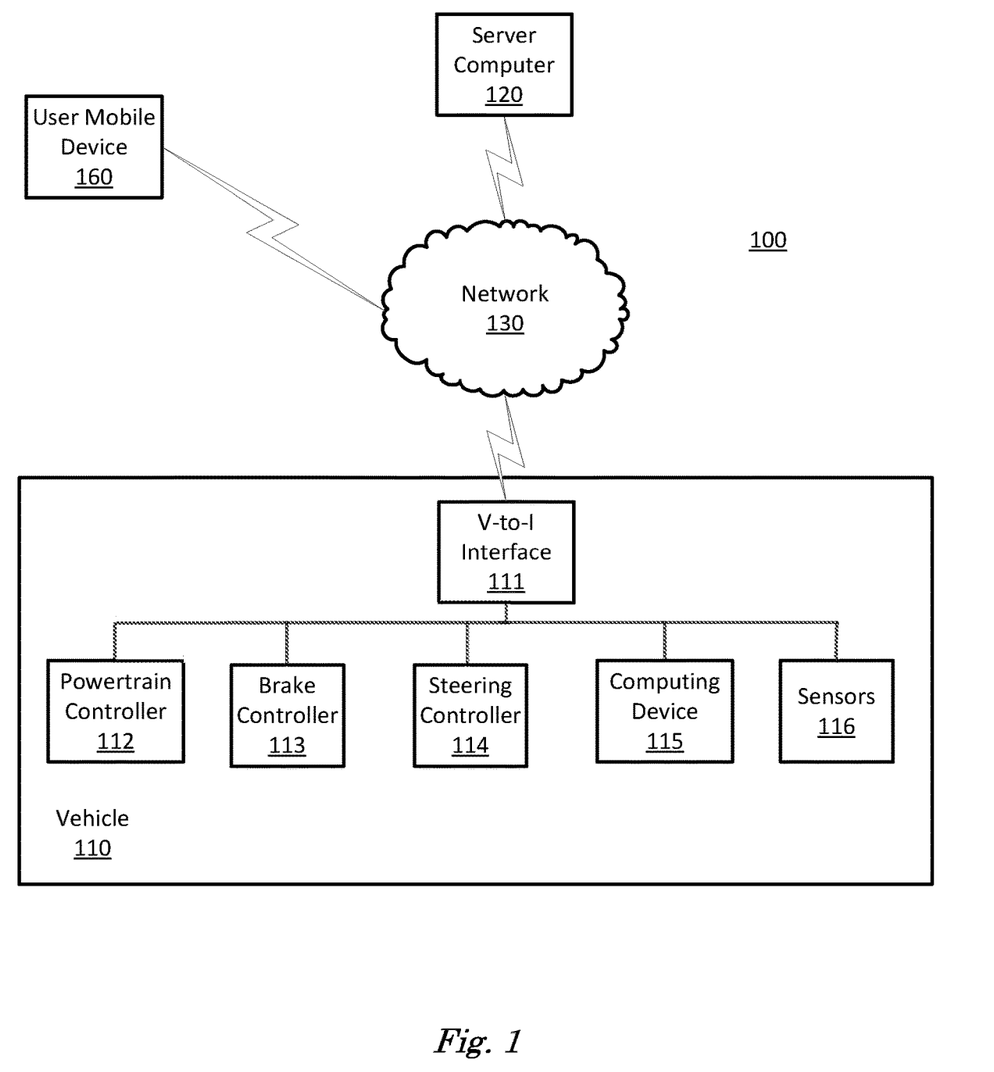
FIG. 1 is a block diagram of an example traffic infrastructure system.

FIG. 1 is a diagram of a traffic infrastructure system 100 that includes a vehicle 110 operable in autonomous ("autonomous" by itself in this disclosure means "fully autonomous"), semi-autonomous, and occupant piloted (also referred to as non-autonomous) mode. Vehicle 110 also includes one or more computing devices 115 for processing data for piloting the vehicle 110 during autonomous operation. Computing devices 115 can receive data regarding the operation of the vehicle from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (Wi-Fi) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
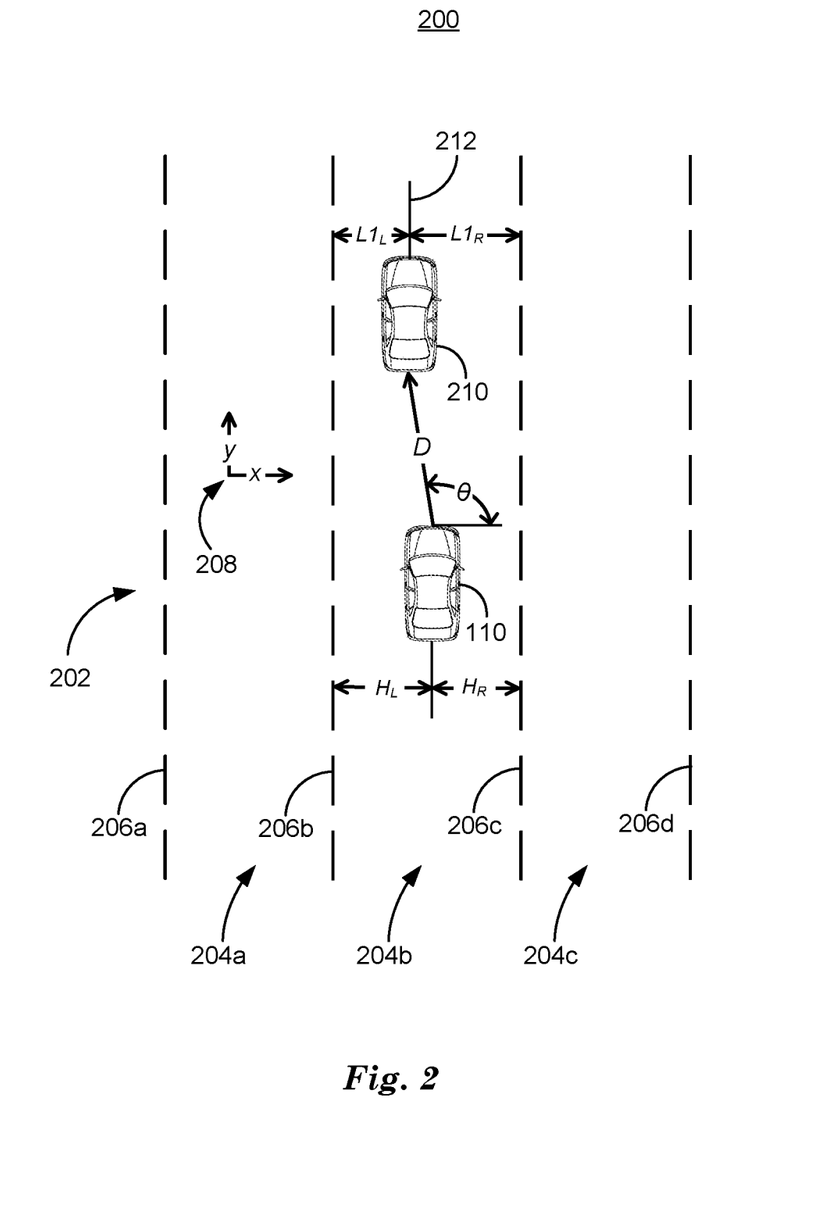
FIG. 2 is a diagram of an example traffic scene.

FIG. 2 is a diagram of a traffic scene 200. Traffic scene 200 includes a roadway 202 that includes lanes 204a, 204b, 204c (collectively, lanes 204), the lanes 204 being delimited, i.e., boundaries thereof being shown or marked, by lane markers 206a, 206b, 206c, 206d (collectively lane markers 206). Locations on roadway 202 can be described in x, y coordinates 208 in a plane parallel to the surface of roadway 202 in a global coordinate system such as latitude, longitude. Distance D and angle θ and between a first vehicle 110 and a second vehicle 210 can be measured with respect to x, y coordinates 208, for example.

A computing device 115 in vehicle 110 can operate vehicle 110 on a roadway 202 by determining a vehicle path based on x, y coordinates 208 and controlling vehicle powertrain, brakes and steering via controllers 112, 113, 114 to direct vehicle 110 motion to travel along, i.e., attempting to follow, the determined vehicle path. The vehicle path can be determined by determining locations, in x, y coordinates 208, of lane markers 206b, 206c with respect to vehicle 110, for example. Locations of lane markers 206B, 206c with respect to vehicle 110 can be determined from data acquired by computing device 115 from sensors 116, including one or more of video sensors, radar sensors and lidar sensors. Computing device 115 can determine a vehicle path upon which to operate vehicle 110 based on locations of lane marker 206b, 206c that maintains vehicle 110 location in the middle of a lane 204b, for example.

When sensor data 116 is not available due to sensor 116 failure or sensor 116 data unavailability due to location, heavy rain, snow, fog, sand storm, or other atmospheric disturbance, for example, techniques described herein improve operation of vehicle 110 by aggregating sensor data from a second vehicle 210 including locations of lane markers 206b, 206c to determine locations of lane markers 206b and 206c and thereby operate vehicle 110. Computing device 115 can receive lane marker 206b, 206c data from second vehicle 210 via V-to-V communications or via V-to-I communications via a network 130 to communicate between vehicle 110 and vehicle 220.

A computing device 115 in a second vehicle 210 can determine locations of lane markers 206b, 206c with respect to a centerline 212 of the second vehicle 210 based on video sensor data. A computing device 115 can acquire video sensor data and process the acquired video sensor data with machine vision techniques to determine locations of lane markers 206b, 206c with respect to second vehicle 210. For example, a computing device can process acquired video data with a Hough transform to determine linear features that can be filtered, combined, and orthographically projected onto a top-down map based on the video sensor field of view and lens magnification to form lane markers 206. Based on determined lane markers 206b, 206c, left lane marker location $L1_L$ and right lane marker location $L1_R$ can be determined with respect to second vehicle 210.

Vehicle 110 can receive data regarding lane markers 206b, 206c and can combine the lane marker 206b, 206c data with data specifying a distance D and angle θ determined from data from vehicle 110 sensors 116 to determine locations of lane markers 206b, 206c with respect to vehicle 110 based on geometric calculations. A vehicle 110 can determine distance D and angle θ to a second vehicle 210 from sensor 116 data. For example, radar sensors can return distances and angles to vehicles in an environment around a vehicle 110. Lidar sensors can also return distances and angles to objects in an environment around a vehicle. When vehicle 110 sensors 116 cannot determine distance D and angle θ determined based on vehicle 110 sensors 116 due to sensor 116 failure or sensor 116 data unavailability as discussed above, computing device 115 can receive data regarding distance D and angle θ from second vehicle 210.

Computing device 115 can determine a location $H_L$ of a left lane marker 206b, location $H_R$ of a right lane marker 206c, left and right lane marker 206b locations $L1_L$, right lane marker 206c location $L1_R$, distance D, and angle θ according to equations:

$$X_{L1-H} = D*\cos(\theta) \quad (1)$$

$$H_L = L1_L - X_{L1-H} \quad (2)$$

$$H_R = L1_R + X_{L1-H} \quad (3)$$

Where factor $X_{L1-H}$ measures the x offset between host vehicle 110 and second vehicle 220. The y offset between vehicle 110 and second vehicle 220 can be measured by the equation:

$$Y_{L1-H} = D*\sin(\theta) \quad (4)$$

$Y_{L1-H}$ corresponds to the distance between vehicles in lane and can be used to condition the $X_{L1-H}$ measure, for example if $Y_{L1-H}$ indicates that the vehicles are too far apart, the $X_{L1-H}$ measure may not be reliable and should not be used. A value ε can be input by a user and used to limit $X_{L1-H}$:

$$-\varepsilon \leq X_{L1-H} \leq \varepsilon \quad (5)$$

Where ε can be selected to keep the measure $X_{L1-H}$ limited to one lane 204. When vehicle 110 has determined right and left lane marker 206b, 206c locations $H_L$ and $H_R$, vehicle 110 can operate on roadway 202 in a lane 204b despite sensor 116 failure, etc.

Figure 3:
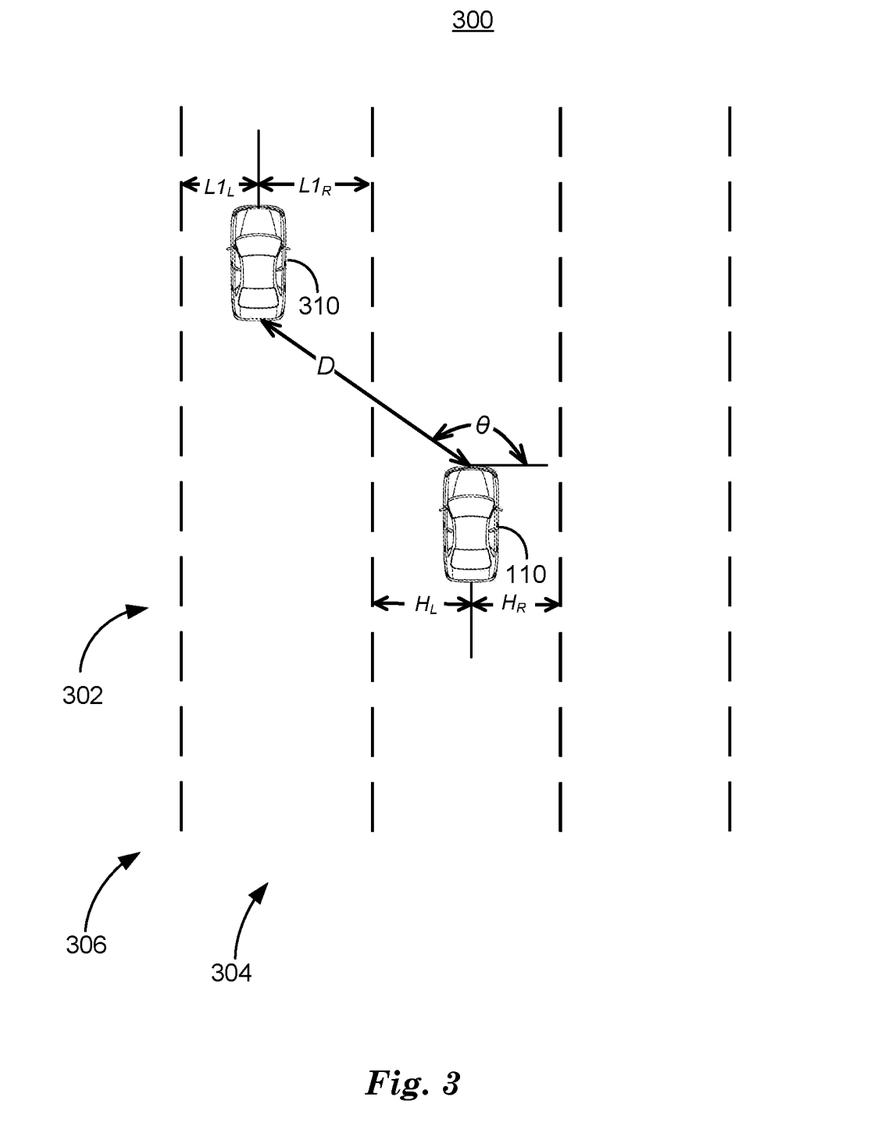
FIG. 3 is a diagram of another example traffic scene.

FIG. 3 is a diagram of a traffic scene 300. Traffic scene includes a roadway 302 with lanes 304 having lane markers 306. In traffic scene 300 no vehicle exists in the same lane 304 as vehicle 110; however, second vehicle 310 is in an adjacent lane 304. An extension can be made to equations (2) and (3) above to handle second vehicles 310 operating in other lanes as determined by equation (5), above:

$$H_L = L1_L - X_{L1-H} - N*LW \quad (6)$$

$$H_R = L1_R + X_{L1-H} + N*LW \quad (7)$$

Where LW is the lane width=$L1_L + L1_R$ and N is the number of lanes 304 relative to vehicle 110 lane 304. N can be calculated as =round(|$X_{L1-H}$|/LW).

Figure 4:
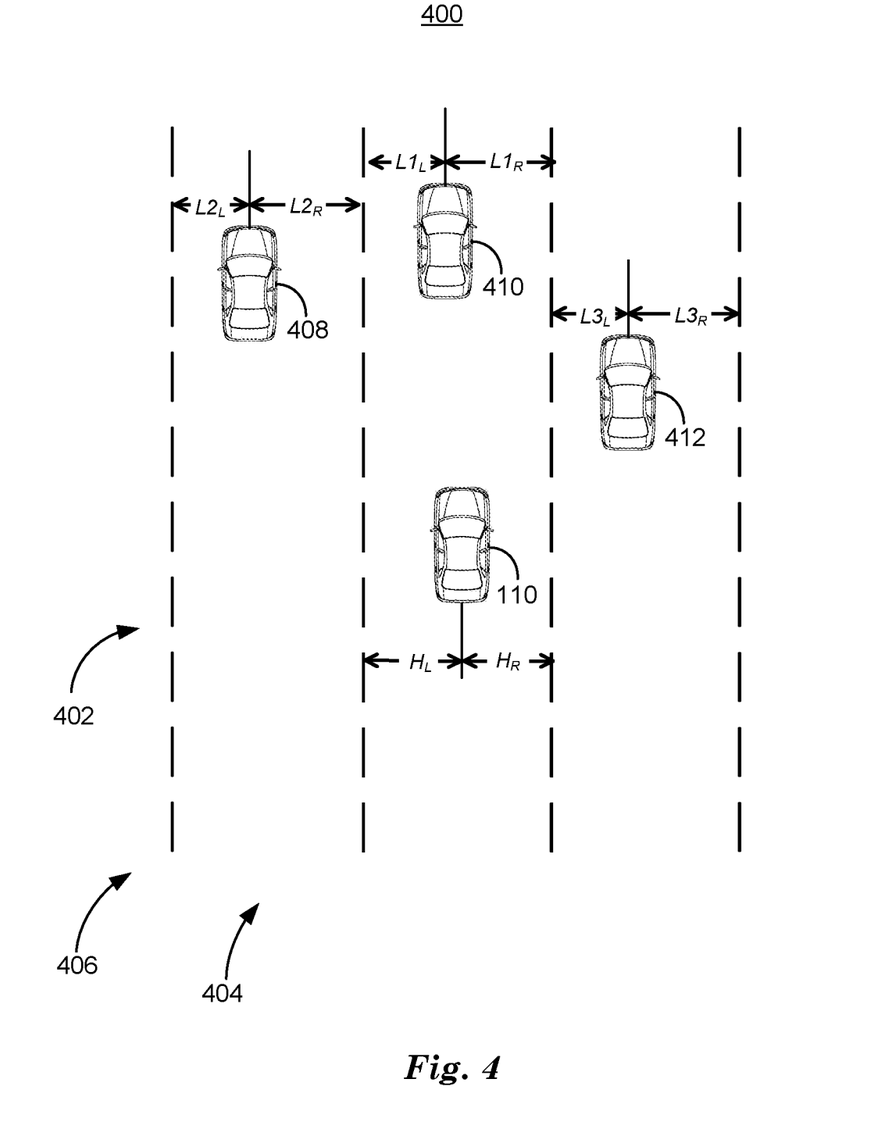
FIG. 4 is a diagram of another example traffic scene.

FIG. 4 is a diagram of a traffic scene 400. Traffic scene 400 includes a roadway 402 having lanes 404 delimited by lane markers 406. In examples where two or more additional vehicles accompany a vehicle 110 on a roadway, two or more lane marker 406 locations $H_L$ and $H_R$ can be obtained from the two or more additional vehicles and averaged together to form an estimate of lane marker 406 locations. In traffic scene 400, a second vehicle 408, a third vehicle 410, and a fourth vehicle 412 are in lanes 404 of a roadway 402 near a vehicle 110. Using equations (2), (3), (6) and (7), above, equations for determining lane marker 406 locations for vehicle 110 can be:

$$H1_L = L1_L - X_{L1-H} \quad (8)$$

$$H1_R = L1_R + X_{L1-H} \quad (9)$$

$$H2_L = L2_L - X_{L2-H} - N*LW \quad (10)$$

$$H2_R = L2_R + X_{L2-H} + N*LW \quad (11)$$

$$H3_L = L3_L - X_{L3-H} + N*LW \quad (12)$$

$$H3_R = L3_R + X_{L3-H} - N*LW \quad (13)$$

Where the parameter N is a function of the lead vehicle and is equal to N1, N2, or N3, depending upon which lead vehicle the distance is calculated from. N can be calculated as round(|$X_{L1-H}$|/LW), round(|$X_{L2-H}$|/LW), or round(|$X_{L2-H}$|/LW), for each vehicle respectively. The lane marker 406 locations $H_L$ and $H_R$ for vehicle 110 can be determined by averaging the lane marker 406 locations from equations (8)-(13):

$$H_L = \text{mean}(H1_L, H2_L, H3_L) \quad (14)$$

$$H_R = \text{mean}(H1_R, H2_R, H3_R) \quad (15)$$

Figure 5:
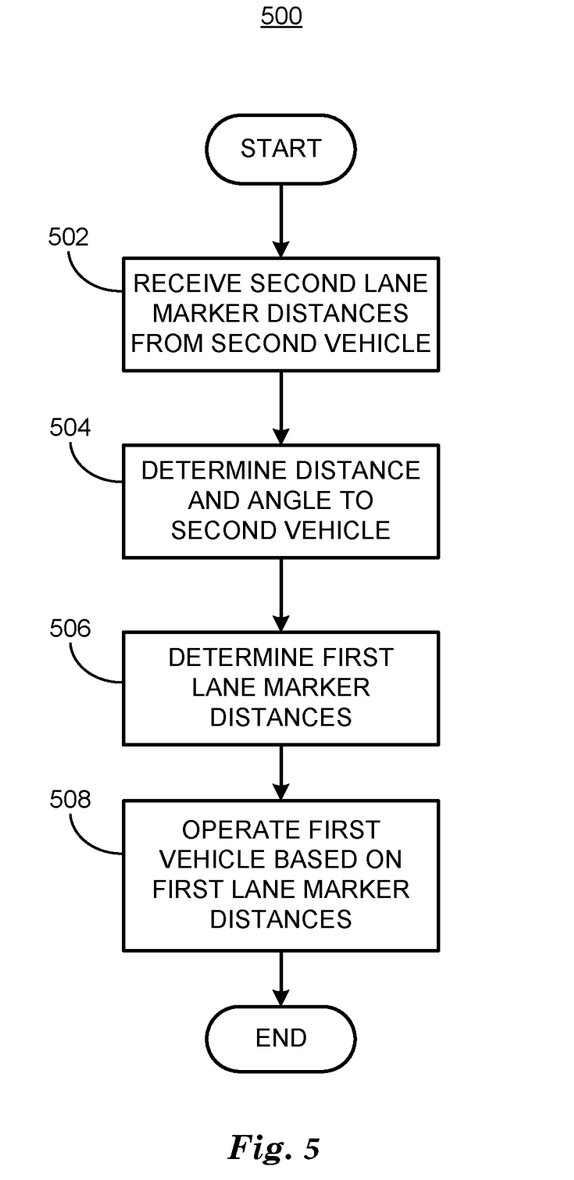
FIG. 5 is a flowchart diagram of a process to operate a vehicle based on determined lane marker distances.

FIG. 5 is a diagram of a flowchart, described in relation to FIGS. 1-4, of a process 500 for operating a vehicle 110 based on estimated path coefficients. Process 500 can be implemented by a processor of computing device 115, taking as input data from sensors 116, and executing commands and sending control signals via controllers 112, 113, 114, for example. Process 500 includes multiple blocks taken in the disclosed order. Process 500 could alternatively or additionally include fewer blocks or can include the blocks taken in different orders.

Process 500 begins at block 502, where a computing device 115 in a vehicle 110 can receive, e.g., via an ad hoc wireless network between vehicles (V-to-V networking) or via a traffic infrastructure system (V-to-I networking), data regarding left and right lane marker 206 distances from a second vehicle 210. Vehicle 110 can require data regarding lane marker 206 locations to operate, where sensor failure or inclement weather can cause missing sensor data, vehicle 110 can require an alternate source of data regarding lane markers 206. Second vehicle 210 can be near, i.e., within a distance specified for a current speed zone to be sufficiently close for data from the second vehicle 210 to be useful for the vehicle 110, e.g., within a predetermined distance such as ten or twenty meters at speeds of 60-80 kilometers per hour, vehicle 110 in the same lane 204 or in another lane 204 that can be adjacent to (i.e., immediately next to) the vehicle's 110 lane 204 or separated from the vehicle's 110 lane by one or more lanes. Computing device 115 in vehicle 110 can also receive data regarding left and right lane marker data from a third vehicle or more.

At block 504 computing device 115 in a vehicle 110 can determine a distance D and an angle θ to a second vehicle 210. Computing device 115 can acquire data from sensors 116, for example a radar sensor or a lidar sensor, included in a vehicle 110 to determine the distance and angle to the second vehicle 210. Computing device 115 can also determine distance D and angle θ to third or more vehicles in examples where lane marker 206 data is received from additional vehicles. In examples where sensors 116 included in a vehicle 110 cannot acquire distance and angle data, for example due to sensor failure or inclement weather, the distance and angle data can be received from a second vehicle 210. Computing device 115 can also determine or receive distance and angle data for third or more vehicles.

At block 506 computing device 115 can determine lane marker 206 distances $H_L$ and $H_R$ according to equations (2), (3), (6), (7) or (8)-(15), depending upon the location and number or additional vehicles near a vehicle 110, determined based on the received lane marker 206 distances and a distance D and angle θ as discussed above in relation to FIGS. 2-4.

At block 508, computing device 115 can operate a vehicle 110 on a roadway 202 based on lane marker 206 locations $H_L$ and $H_R$. Computing device 115 can determine a vehicle path upon which to operate a vehicle 110 that maintains vehicle 110 at locations between lane marker 206 locations $H_L$ and $H_R$ in the middle of a lane 204. For example, a vehicle can determine a nominal vehicle path, where the nominal vehicle path is a vehicle path upon which vehicle 110 is most preferably traveling. The nominal vehicle path can be located in the center of a lane 204 as defined by lane marker locations $H_L$ and $H_R$, for example. Computing device 115 can determine a vehicle location based on vehicle sensors such as GPS and IMU and determine a vehicle path defined by a polynomial function that can be used to direct vehicle 110 from operating at a current location to operating along the nominal path. The polynomial function can be determined by a control process that inputs vehicle locations and output vehicle location predictions, for example a proportional, integrating, derivative (PID) control process or an alpha, beta, gamma control process, as are known in the art.

At block 510, the computer 115 operates the vehicle 110 according to the determined vehicle path, e.g., operates one or more of braking, steering, or propulsion to attempt to follow the path determined according to pane marker distances. Following block 510, process 500 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A method, comprising:
   determining first lane marker distances based on second lane marker distances received at a first vehicle from a second vehicle and a distance and an angle measured from the first vehicle to the second vehicle and based on one or more trigonometric calculations that use the distance and the angle to determine factors to convert second lane marker distances to first lane marker distances; and
   operating a vehicle based on the first lane marker distances.

2. The method of claim 1, wherein second lane marker distances are distances measured from a centerline of the second vehicle to a left lane marker and a right lane marker.

3. The method of claim 2, wherein the distances from the centerline of the second vehicle to the left lane marker and the right lane marker are based on second vehicle sensor data.

4. The method of claim 1, wherein the second vehicle is operating in a second lane adjacent to a first lane in which the first vehicle is operating.

5. The method of claim 4, wherein the second vehicle is operating in a third lane separated from the first lane in which the first vehicle is operating by one or more additional lanes.

6. The method of claim 1, further comprising determining first lane marker distances based on one or more additional lane marker distances received by the first vehicle from one or more additional vehicles and distances and angles measured from the first vehicle to the additional vehicles.

7. The method of claim 6, wherein the first lane marker distances are determined based on averages of the second lane marker distances and additional lane marker distances.

8. The method of claim 1, wherein the distance and the angle are determined based on first vehicle sensor data.

9. The method of claim 1, wherein the distance and the angle are determined based on second vehicle sensor data.

10. The method of claim 1, wherein the vehicle is operated by controlling one or more of vehicle powertrain, vehicle brakes, and vehicle steering.

11. A system, comprising a processor; and
    a memory, the memory including instructions to be executed by the processor to:
      determine first lane marker distances based on second lane marker distances received at a first vehicle from a second vehicle and a distance and an angle measured from the first vehicle to the second vehicle and based on one or more trigonometric calculations that use the distance and the angle to determine factors to convert second lane marker distances to first lane marker distances; and
      operate a vehicle based on the first lane marker distances.

12. The system of claim 11, wherein second lane marker distances are distances measured from a centerline of the second vehicle to a left lane marker and a right lane marker.

13. The system of claim 12, wherein the distances from the centerline of the second vehicle to the left lane marker and the right lane marker are based on second vehicle sensor data.

14. The system of claim 11, wherein the second vehicle is operating in a second lane adjacent to a first lane in which the first vehicle is operating.

15. The system of claim 14, wherein the second vehicle is operating in a third lane separated from the first lane in which the first vehicle is operating by one or more additional lanes.

16. The system of claim 11, further comprising determining first lane marker distances based on one or more additional lane marker distances received by the first vehicle from one or more additional vehicles and distances and angles measured from the first vehicle to the additional vehicles.

17. The system of claim 11, wherein the first lane marker distances are determined based on averages of the second lane marker distances and additional lane marker distances.

18. The system of claim 11, wherein the distance and the angle are determined based on first vehicle sensor data.

19. The system, of claim 11, wherein the distance and the angle are determined based on second vehicle sensor data.

20. The system of claim 11, wherein the vehicle is operated by controlling one or more of vehicle powertrain, vehicle brakes, and vehicle steering.

\* \* \* \* \*